US010411948B2

(12) United States Patent
Luo

(10) Patent No.: US 10,411,948 B2
(45) Date of Patent: Sep. 10, 2019

(54) COOPERATIVE ACTIVE-STANDBY FAILOVER BETWEEN NETWORK SYSTEMS

(71) Applicant: Nicira, Inc., Palo Alto, CA (US)

(72) Inventor: Haihua Luo, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 62 days.

(21) Appl. No.: 15/676,253

(22) Filed: Aug. 14, 2017

(65) Prior Publication Data

US 2019/0052520 A1   Feb. 14, 2019

(51) Int. Cl.
 *H04L 12/24* (2006.01)
 *H04L 12/26* (2006.01)

(52) U.S. Cl.
 CPC ...... *H04L 41/0659* (2013.01); *H04L 41/0668* (2013.01); *H04L 41/0816* (2013.01); *H04L 43/0817* (2013.01); *H04L 43/10* (2013.01)

(58) Field of Classification Search
 CPC ............. H04L 41/0659; H04L 41/0816; H04L 43/0817; H04L 43/10; H04L 41/0663; H04L 41/0654; H04L 43/04; H04L 41/0695; H04L 41/06; H04L 41/0631; H04L 41/0806; H04L 41/0813; H04L 41/0856
 See application file for complete search history.

(56) References Cited

U.S. PATENT DOCUMENTS

| | | | | |
|---|---|---|---|---|
| 5,473,599 A | * | 12/1995 | Li | G06F 11/2005 370/219 |
| 8,660,045 B2 | * | 2/2014 | Lundstrom | H04L 43/10 370/310 |
| 2002/0095489 A1 | * | 7/2002 | Yamagami | G06F 11/2094 709/224 |
| 2003/0005356 A1 | * | 1/2003 | Franckowiak | G06F 11/2097 714/11 |
| 2004/0001449 A1 | * | 1/2004 | Rostron | G06F 11/1489 370/282 |
| 2007/0160058 A1 | * | 7/2007 | Zhou | H04L 29/06027 370/395.2 |
| 2008/0101314 A1 | * | 5/2008 | Bachmutsky | H04L 43/0817 370/342 |
| 2011/0060824 A1 | * | 3/2011 | Lundstrom | H04L 43/10 709/224 |
| 2011/0299386 A1 | * | 12/2011 | Negoto | H04L 45/22 370/221 |

(Continued)

*Primary Examiner* — Wutchung Chu
(74) *Attorney, Agent, or Firm* — Adeli LLP

(57) ABSTRACT

A method of determining the state of each peer node in a pair of first and second peer nodes is provided. The first node is configured as a confirmed active node and the second node is configured as a standby node. The second node transitions into a tentative active mode when a predetermined number of heartbeat messages are lost between the pair nodes while the first and second nodes remain functional. The second node receives a first message from the first node after the heartbeat messages are established between the peer nodes. The first message indicates that the first node is in the confirmed active mode. In response to the first message, the second node transitions from the tentative active mode into the standby mode and sends a second message from the second node to the first node indicating that the second node is in the standby mode.

17 Claims, 10 Drawing Sheets

(56) References Cited

U.S. PATENT DOCUMENTS

| | | | |
|---|---|---|---|
| 2013/0051219 A1* | 2/2013 | Bajamahal | H04L 45/02 370/220 |
| 2013/0114402 A1* | 5/2013 | Ould-Brahim | H04L 43/0811 370/225 |
| 2016/0165463 A1* | 6/2016 | Zhang | H04L 43/10 370/218 |
| 2016/0234059 A1* | 8/2016 | Gu | H04L 41/0668 |
| 2017/0155542 A1* | 6/2017 | Fang | H04L 41/0654 |
| 2017/0373926 A1* | 12/2017 | Shang | H04L 41/0654 |
| 2018/0176073 A1* | 6/2018 | Dubey | H04L 69/325 |

\* cited by examiner

COOPERATIVE ACTIVE-STANDBY FAILOVER BETWEEN NETWORK SYSTEMS

BACKGROUND

Some networks deploy a pair of active and standby network nodes (e.g., network appliances such as switches or gateways) to provide high availability (HA) and ensure that the services provided by the network nodes are available even when a hardware or software failure renders a single node unavailable. One of the nodes functions in active mode and actively forwards traffic and provides other network services. The other network node functions in a standby state, waiting to take over should the active node fail. The active and standby nodes maintain a heartbeat with each other, e.g. by relying on a bidirectional forwarding detection (BFD) protocol.

A split-brain condition occurs when both nodes go active and serve the same set of users while the users should have one system in active and the other in standby mode. The condition can occur when the standby node does not receive a heartbeat from the active node within a specified time and the standby node also declares itself as an active node. The condition can also occur when the active node goes down, the standby node declares itself active, and the previously active node becomes functional at a later time. When both nodes switch to active mode, one node has to go back to the standby mode while the other remains in active mode. The nodes are typically assigned a rank or priority and the node with the lower rank is forced to go back to the standby mode. The ranks are configured by the user and do not change.

To describe the problem with this approach, assume that before the split-brain condition, node A has a higher rank than node B. Node A is, therefore, active and node B is standby. If node B does not receive the heartbeat from node A, both nodes become active. If node A subsequently fails, node B continues to be the active node. After node A recovers, node A may become active and node B may become standby since node A is assigned a higher rank. In other words, the higher rank node takes over and becomes the active node no matter which node was active prior to the split-brain condition. The desired healing procedure is for node B to remain active (because it is active to start with), and node A to go back to standby. The preemptive flipping of the active node from node B to node A in this case is unnecessary. For instance, even though the user assigns a different rank between the two nodes, the nodes may be equally equipped in terms of the processing, memory and other resources.

Another approach to resolve the split-brain condition is the use of a third entity. When no priority is assigned to the nodes, the two nodes may enter into a tie with both wanting to go active. This situation is resolved by using the third entity (e.g., the management plane and/or the control plane of the network) to break the tie. The use of the third entity to break the tie raises other issues. The third entity may be located in the management plane and/or the control plane of the network and messages from the network nodes to the third entity may get lost, the third entity may get an incorrect state regarding the state of the active and standby nodes, etc.

BRIEF SUMMARY

Some embodiments provide a method of determining active and standby roles for a pair of peer network nodes. The method splits the active mode into a tentative active (or active requested) mode and a confirmed active (or active set) mode. A standby node can move to the tentative active mode without communicating with the peer node. A node can only move from the tentative active mode to the confirmed active mode after handshaking with the peer node.

In some embodiments, the peers periodically receive each other's status and ensure that one node is in the confirmed active mode and the other node is in standby mode. In some embodiments, the two peer nodes rely on a protocol such as bidirectional forwarding detection (BFD) protocol that establishes a session to establish a heartbeat between the two peers.

When the standby node determines that the confirmed active node is not responsive, the standby node moves from the standby mode to the tentative active mode. For instance, the standby node may not receive several BFD packets due to a failure of the confirmed active node or due to a failure of the BFD protocol. Once the peers reestablish the heartbeat among them, the peer nodes use a protocol to determine which node has to act as a confirmed active node and which node has to act as standby.

In cases where a first peer node that was not functional becomes ready to resume providing services, the first peer node has to first determine the current mode of operation of the second peer node. The first node in some embodiments transitions from a down (or not ready) state to a probing state. The first node then sends a probe message to the second node to inquire the current state of the second node. If the second node responds that the second node is in the tentative active mode, the first node transitions to standby mode. The first node transitions to the standby mode regardless of the roles of the two nodes when the first node became not ready. In other words, even if the first node was in the confirmed active mode or the tentative active mode prior to going to not ready state, the first node goes to the standby mode upon receiving a message from the second node that the second node is already in tentative active mode.

The transition of the first node to standby is also regardless of whether or not the user has configured the peer nodes with different ranking. For instance, in the embodiments that the user assigns rankings to the peers, a higher-ranking first peer still transitions to the standby mode upon learning that the second node is already in tentative active mode, instead of preemptively forcing the second node to go to the standby mode.

The first node then sends a message to the second node informing the second node that the first node has transitioned to the standby mode. The second node uses the message as a confirmation from the peer that the second node can assume the role of the confirmed active node. The second node transitions from the tentative active mode to the confirmed active mode.

In some cases, the second node is not ready when the first node becomes ready and sends a probe message to the second node. In these cases, the second node responds with a reply message indicating that the second node is not ready. The first node uses the message from the second node to transition to the tentative active mode. The second peer node eventually transitions to ready state and starts probing. The second peer node would learn that the first peer node is in the tentative active state. The second peer node then goes to the standby state and indicates so to the first peer node. At that moment, the first peer mode receives the unambiguous confirmation that the second peer node has taken the standby role, and then the first peer node goes from the tentative active mode to the confirmed active mode, concluding the negotiation.

In some cases one of the nodes, e.g., the first node may be in the confirmed active mode while the second node is in the standby mode. When the BFD session is lost between the two nodes due to the failure of the BFD link rather than the failure of one of the peer nodes, the first node remains in the confirmed active mode while the standby node transitions into the tentative active mode. A split-brain condition, therefore, occurs where both nodes are unaware that the other node is in either the confirmed active or tentative active state and both nodes attempt to provide the services of an active node such as forwarding traffic and providing other logical network services. Once the BFD session is restored, the two nodes exchange packets to determine which node should go into the standby mode.

If the first node is the node that first sends a message to the peer upon the reestablishment of the BFD session, the first node indicates that the first node is in the confirmed active mode. In response to receiving the message from the first node, the second node transitions into the standby mode and sends a message to the first node indicating that the second node has transitioned into the standby mode. The first node remains in the confirmed active mode. The first node in some embodiments also sends a signal to all interested parties that the split brain healing has just occurred. This signal is sometimes useful or even critical for other network components outside the active standby pair platform to properly provide service, since they have no knowledge of the split brain healing events unless explicitly signaled as such In the above scenario (where the first node is in the confirmed active mode and the second node in the standby mode), the second node may be the node that first sends a message to the peer node upon the reestablishment of the BFD session. In this case, the second node sends a message to the first node indicating that the second node is in the tentative active mode. The first node stays in the confirmed active mode and responds with a message indicating that the first node is in the confirmed active mode. The second node transitions to the standby mode and sends a message to the first node indicating that the second node has transitioned into the standby node. The first node remains in the confirmed active mode.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1A:
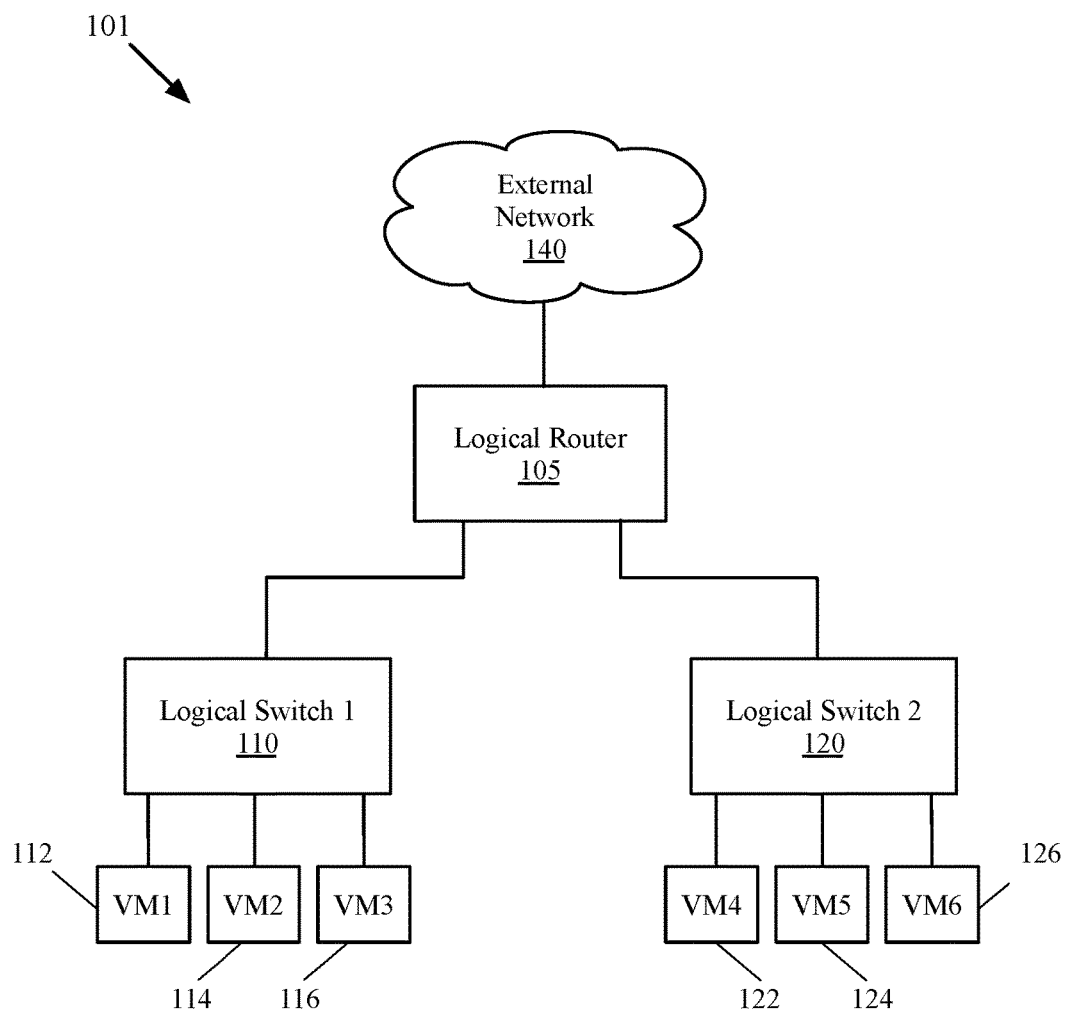
FIGS. 1A and 1B illustrate a logical network topology that includes several network elements and a physical network that implements the illustrated logical network.

Some embodiments provide a method of determining active and standby roles for a pair of peer network nodes. The method provides two distinct active modes: a tentative active (or active requested) mode and a confirmed active (or active set) mode. A node can move to the tentative active mode without communicating with the peer node. A node cannot move to the confirmed active mode without handshaking with the peer node.

The nodes in some embodiments are network appliances such as switches or gateways. For instance, the nodes may be edge gateways that handle the north-south traffic of one or more logical networks. The north-south traffic refers to network packet traffic that comes in and goes out of a network. A node in either tentative or confirmed active mode actively passes through the network traffic. For example, an edge node may pass north-south traffic for a logical network.

The standby peer is synchronized and ready to transition to one of the tentative or confirmed active states, should a failure occur. In this configuration, both peers share the same configuration settings and one is active until a path, link, system, or network failure occurs. A node in either tentative or confirmed active mode also provides stateful services (e.g., stateful firewall, load balancing, etc.) to the end machines of the network in some embodiments.

An example of such a pair of peer nodes is a pair of edge appliances (e.g., gateways) that are deployed to provide high availability (HA). High availability ensures that the services provided by edge appliances are available even when a hardware or software failure renders a single appliance unavailable. A first edge node actively forwards traffic and provides other logical network services, whereas the second edge node is in a standby state, waiting to take over should the first edge node fail. The first node maintains a heartbeat with the second node and sends service updates through one or more internal interfaces (also referred to as HA interfaces). In some embodiments, when an edge node is declared as a high availability edge node (e.g., when an HA option is enabled for an edge node), a second edge node is dynamically configured to act as a standby edge node for the active edge node.

The pair of high availability gateway machines at the edge of the network provides edge services to the data compute nodes (DCNs) of the network (e.g., to the virtual and physical machines of a network). The edge services provided by the edge nodes include, but are not limited to, layer three (L3) routing of network data (e.g., towards or from one or more end machines in one or more external networks) and stateful services (e.g., DHCP, firewall, NAT, load balancing, etc.) on the network traffic.

The edge nodes of some embodiments can be physical machines or any other type of a data compute node such as a virtual machine (VM), a container, etc., that instantiates and executes on another machine (e.g., an edge host machine). Additionally, the end machines of a logical network can also be physical machines or any other type of DCNs that executes on one or more host machines of a hosting system (e.g., a datacenter). These end machines are logically connected to each other and to other end machines of other networks (logical and/or physical networks) through a set of logical forwarding elements of the logical network.

The set of logical forwarding elements is implemented by one or more managed forwarding elements that operate (executes) on each host machine in some embodiments. A managed forwarding element operates in a virtualization software (e.g., a hypervisor) of a host machine. The set of logical forwarding elements is also implemented by one or more managed hardware forwarding elements (e.g., a hardware top of rack (TOR) switch) through physical ports of which a set of physical machines (e.g., physical servers) logically connects to the logical network.

A logical network, in some embodiments, in addition to several different L2 and L3 logical forwarding elements (e.g., logical switches and logical routers), includes other logical network elements (e.g., logical firewall, logical load balancer, etc.) that are placed on different logical paths of the logical network. Through these logical network elements, several different DCNs that run on different host machines connect to each other, to other physical machines of the logical network (e.g., physical machines connected to managed hardware forwarding elements such as TOR switches, hardware routers, etc.), and to other end machines of other networks.

In some embodiments, a user defines a logical network topology (i.e., defines the logical network elements and the connections between these elements) for a logical network through a management plane of the logical network. The management plane of a logical network, in some embodiments, includes one or more manager machines (or manager applications) through which the different logical network elements are defined (e.g., through API calls, user interfaces). The management plane pushes the network elements' data to the control plane of the logical network (e.g., one or more controller computers (or applications) that control the data exchange between the managed forwarding elements in the logical network).

The management and control planes push the configuration data to a set of physical nodes (e.g., host machines, gateway machines, etc.) in order to configure the physical nodes to implement the logical network (i.e., to implement the logical network elements of the logical network). The configuration and forwarding data that is distributed to the physical nodes defines common forwarding behaviors of the managed forwarding elements (MFEs) that operate on the physical nodes in order to implement the logical forwarding elements (LFEs). The configuration data also configures the virtualization software of the host machines to implement other logical network elements (e.g., to instantiate a distributed firewall instance on each hypervisor that implements the logical firewall). In some embodiments, a local controller that operates on each physical node (e.g., in the hypervisor of a host machine) receives the configuration and forwarding data from a central control plane (CCP) cluster first.

The local controller then generates customized configuration and forwarding data that, for example, defines specific forwarding behavior of an MFE that operates on the same host machine on which the local controller operates and distributes the customized data to the MFE. The MFE implements the set of logical forwarding elements based on the configuration and forwarding data received from the local controller. Each MFE can be connected to several different DCNs, different subsets of which may belong to different logical networks (e.g., for different tenants). As such, the MFE is capable of implementing different sets of logical forwarding elements for different logical networks.

Figure 1B:
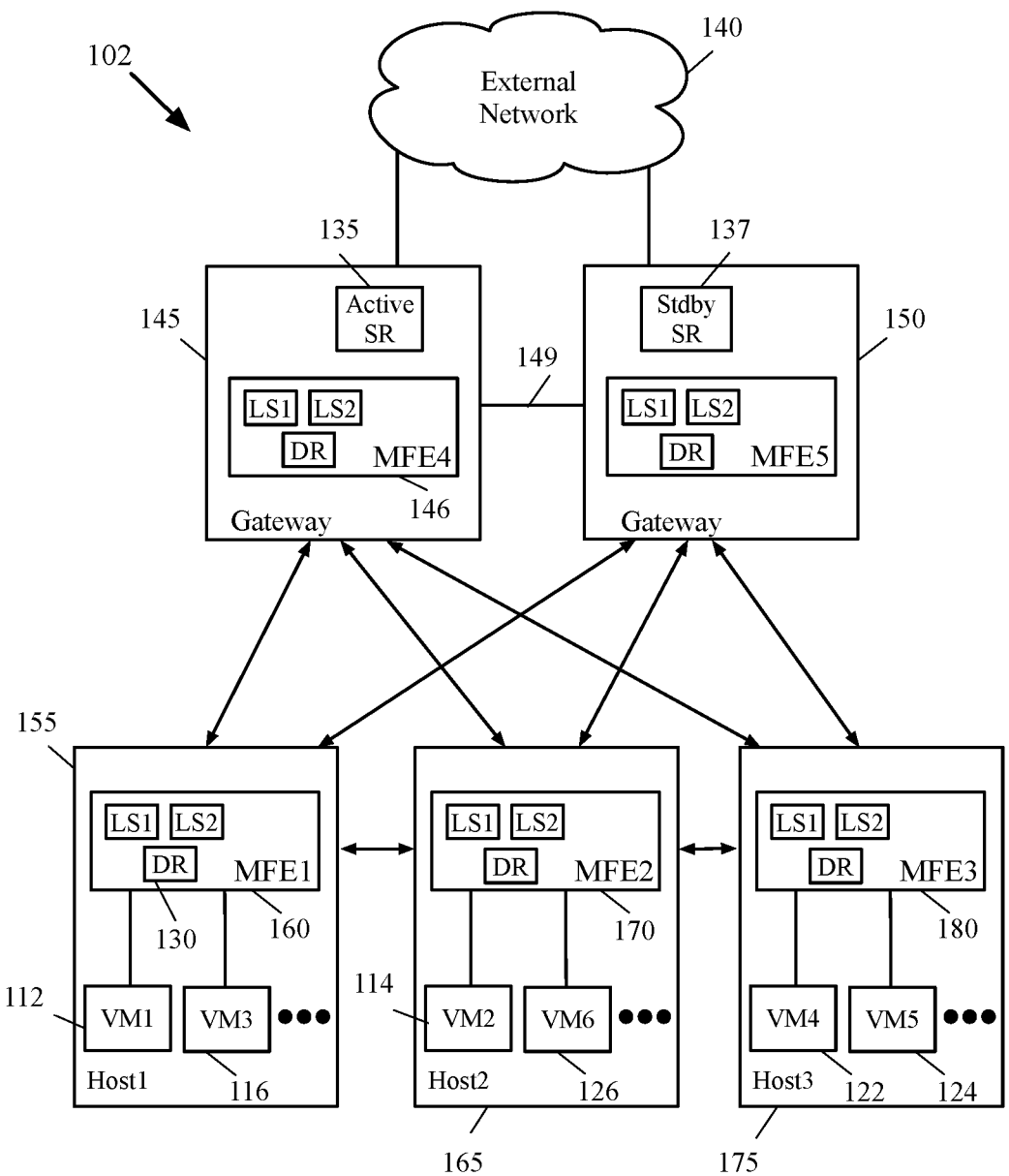

FIGS. 1A and 1B illustrate a logical network topology that includes several network elements and a physical network that implements the illustrated logical network. More specifically, FIG. 1A conceptually illustrates a logical network 101 that includes a logical router 105, two logical switches 110 and 120, and an external network 140. The logical network 101 can be an overlay network (e.g., defined for a tenant of a datacenter) that is implemented by a physical network infrastructure (e.g., a physical network of a datacenter).

The logical router 105 connects the logical switches 110 and 120 to each other and to the external network 140. The logical switch 110 logically connects the VMs 112-116 to each other and to the logical network 101, while the logical switch 120 logically connects the VMs 122-126 to each other and to the logical network 101. Through these logical network forwarding elements, the VMs 112-116 and VMs 122-126 communicate with each other and with other end machines in the external network 140. Each of these logical network elements can be defined (e.g., through a set of API calls) by a user (e.g., a datacenter network administrator, a tenant, etc.).

It should be understood that the number of logical network elements illustrated in the figure is limited in order to simplify the description. Otherwise, a logical network may have many more logical network elements such as additional logical forwarding elements and/or logical middleboxes (e.g., logical firewalls, logical DHCP servers, logical load balancers, etc.). Conversely, a logical network may include a single logical network element (e.g., a logical switch) that logically connects several different machines (physical or virtual) to the logical network. Similarly, the number of demonstrated virtual machines is exemplary. A real logical network may connect hundreds or even thousands of virtual and physical machines together and to other networks.

FIG. 1B conceptually illustrates the physical implementation of the logical forwarding elements illustrated in FIG. 1A. More specifically, this figure shows how the physical nodes of the physical network architecture 102 are configured to implement the logical switches and router of the logical network architecture 101 shown in FIG. 1A. The physical nodes shown in this figure include two gateway machines 145 and 150, and three host machines 155, 165, and 175. The figure also shows that the two gateway machines 110 and 120 are connected to the external network 140 (e.g., through physical routers).

Each of the illustrated physical nodes includes a managed forwarding element (MFE) that operates in the virtualization software of the physical node in some embodiments. More specifically, host machine 155 hosts the virtual machines 112 and 116 (along a set of other VMs) and executes MFE 160; host machine 165 hosts the virtual machines 114 and 126 (along a set of other VMs) and executes MFE 170; and host machine 175 hosts the virtual machines 122 and 124 (as well as a set of other VMs) and executes MFE 180.

Each MFE implements the LFEs of the logical network by performing the forwarding processing of the LFEs for the packets that are received from, or sent to the corresponding VMs that are connected to the MFE. For example, the first and third logical ports of the logical switch 110 shown in FIG. 1A are mapped to two physical (software) ports of MFE 160 that are coupled to VM1 and VM3, while the second logical port of this logical switch is mapped to a physical port of MFE 170 that is coupled to VM2. Conversely, a logical port of the logical switch 120 is also mapped to another physical port of MFE 160 that is coupled to the VM 116 (VM3). That is, as shown, each MFE is capable of implementing different logical switches of one or more logical networks.

The virtual machines of each host machine communicate (e.g., exchange network data) with each other, with the virtual machines executing on the other host machines, and with the external network via the MFEs that implement the LFEs of the logical network 101. In some embodiments, the MFEs perform the entire first-hop forwarding processing for the logical switches and routers on packets that are received from the virtual machines. As stated above, the MFEs residing on the host machines Host1-Host3 may also implement logical switches (and distributed logical routers) for other logical networks if the other logical networks have VMs that reside on the host machines Host1-Host3 as well.

In some embodiments, when an MFE executing in one of the host machines Host1-Host3 receives a packet from a VM that is coupled to the MFE, it performs the processing for the logical switch to which that VM is logically coupled, as well as the processing for any additional logical forwarding elements (e.g., processing for logical router 105 if the packet is sent to the external network 140, logical router processing and processing for the other logical switch if the packet is sent to a VM coupled to the other logical switch, etc.).

In some embodiments, when a logical router is defined for a network, one distributed routing component (also referred to as a distributed router or DR) and one or more service routing components (each of which is also referred to as a service router or SR) are also generated. The distributed routing component (DR) is implemented in a distributed manner by numerous machines within the network (e.g., a hosting system network), while each service routing component (SR) is implemented by a single edge node. In addition, a transit logical switch (TLS) is defined for handling communications between the components internal to the logical router (i.e., between the distributed router and the service routers).

Each of these routing components is separately assigned a set of routes and a set of logical interfaces (ports). Each logical interface of each routing component is also assigned a network layer (e.g., Internet Protocol or IP) address and a data link layer (e.g., media access control or MAC) address.

Some embodiments implement the DR of the logical router in a distributed manner across the different MFEs in a same manner that a logical L2 switch spans the different MFEs. Each service router (SR) has an uplink interface for communicating with an external network as well as a TLS interface for connecting to the transit logical switch and communicating the network data with the distributed routing component of the logical router that is also connected to the TLS.

The SRs of a logical router, in some embodiments, may be configured in active-active or active-standby mode. In active-active mode, all of the service components are fully functional at the same time, and traffic can ingress or egress from the logical network through the service components using equal-cost multi-path (ECMP) forwarding principles (balancing the traffic across the various service routing components). In this mode, each logical interface of each separate service component has unique IP and MAC addresses for communicating with an external network and/or with the distributed component (through the transit logical switch).

In the illustrated example, the logical router 105 of FIG. 1A, is defined to have a DR 130 that is being implemented by all of the five managed forwarding elements MFE 1-5, along with the two logical switches LS1 and LS2. This figure also shows that the active gateway machine 145 is implementing an active SR 135 to connect to the external network while the standby gateway machine 150 is implementing a standby SR 137 to substitute SR 135 in a failover switching. The logical router, as described above, also includes a transit logical switch, which is not shown in this figure.

The two gateway machines 145 and 150 connect the logical network 101 to the external network 140. As shown, in addition to executing MFE 146, the gateway machines 145 and 150 each executes an instance (module) 135 and 137 to implement the service router of the logical router 105 to perform L3 routing for the north-south traffic. In a normal situation, only the active SR node 135 (e.g., the node that is operating in the confirmed active mode) handles the north-south traffic and provides stateful services. The standby SR node 137 takes over the edge service providing only when the active edge node becomes unavailable.

The figure shows that the DRs 130 are implemented by the MFEs of the physical nodes (e.g., host machines Host1-Host-3 and the edge nodes 145 and 150). The SR 135, on the other hand, is implemented by a module on the edge nodes only. In some embodiments, the edge nodes 145 and 150 are host machines that execute each of the SRs 135 and 137 (and other stateful services modules such as firewall modules, NAT modules, etc.) as a DCN (e.g., a VM, a container, etc.). In some embodiments, the two edge nodes communicate with each other through one or more private links such as the link 149. These private links are used to exchange heartbeat/BFD messages as well as updated configuration and runtime data (e.g., flow tables, routing tables, etc.).

As an example, when virtual machine 112 (VM1) sends a northbound packet to the external network 140, the datapath on MFE 160 initially runs the source logical switch 110 pipeline (e.g., based on the ingress port through which the packet is received, the source MAC address, etc.). This pipeline specifies forwarding the packet to the logical router 105 (i.e., to the DR 130 of the logical router), the pipeline for which also takes place on the source MFE 160. This pipeline identifies a DR executing on the MFE 146 in the gateway machine 145 as the DR connected to the active SR 135 (i.e., the SR currently in one of the tentative or confirmed active modes).

Next, the source MFE encapsulates the packet with the required data to send the packet to the gateway machine 145 (e.g., in the embodiments that use overlay networks, MFE 160 adds its own IP address to the outer packet header as the source VTEP and the IP address of the MFE 146 as the destination VTEP).

An overlay network is a network virtualization technology that achieves multi-tenancy in a computing environment. Examples of overlay networks include Virtual eXtensible LAN (VXLAN), Generic Network Virtualization Encapsulation (GENEVE), and Network Virtualization using Generic Routing Encapsulation (NVGRE). For instance, VXLAN is a Layer 2 (L2) overlay scheme over a Layer 3 (L3) network. VXLAN encapsulates an Ethernet L2 frame in IP (MAC-in-UDP encapsulation) and allows VMs to be a part of virtualized L2 subnets operating in separate physical L3 networks. Similarly, NVGRE uses Generic Routing Encapsulation (GRE) to tunnel L2 packets over L3 networks. In the example of VXLAN overlay network, a virtual tunnel endpoint (VTEP) is configured on every node connected by VXLAN. The VTEPs are used to connect the end devices to VXLAN segments and to perform VXLAN encapsulation and decapsulation. Each VXLAN network is assigned a unique identifier referred to as virtual network identifier (VNI). Each host VTEP is assigned a unique IP address. The VTEP uses this IP address to encapsulate Ethernet frames and transmit the encapsulated packets to the transport network through the IP interface.

The gateway machine 145 receives the packet, decapsulates the packet (i.e., removes the tunneling data in the outer header of the packet), and sends the packet to the DR of the gateway machine where the pipeline of the gateway machine sends the packet the SR 135. The SR 135 pipeline is then executed (e.g., by a VM implementing the SR in some embodiments, by the gateway machine in other embodiments). The SR pipeline ultimately sends the packet to the physical external network. In some embodiments the SR's northbound interface is coupled to a physical router that receives the packet from the SR and distributes the packet towards its final destination in the external network.

Gateways 145 and 150 in some embodiments implement more than one SR each. In these embodiments, each pair of SRs, one SR on gateway 145 and one SR on gateway 150 are configured to work together as an active-standby pair of SRs. It should be understood that the number of the host machines, edge nodes, and virtual machines illustrated in the figure are exemplary and a logical network for a tenant of a hosting system may span a multitude of host machines (and third-party hardware switches), and logically connect a large number of DCNs to each other (and to several other physical devices that are connected to the hardware switches). Additionally, while shown as VMs in this figure and other figures below, it should be understood that other types of data compute nodes (e.g., namespaces, containers, etc.) may connect to logical forwarding elements in some embodiments.

I. Cooperative Determination of Active Standby States by a Pair of Peer Network Nodes In some embodiments, the two peer network nodes periodically receive each other's status and ensure that one node is in the confirmed active mode and the other node is in standby mode. In some embodiments, the two peer nodes use the BFD protocol that establishes a session to establish a heartbeat between the two peers. In some embodiments, the BFD session is established between the two gateways that implement the two network nodes instead of being directly established between the two network nodes. For instance, in some embodiments, the BFD session is established between gateways 145 and 150 that implement network nodes such as service routers 135 and 137. In either scenario, the network nodes (e.g., SRs 135 and 137) use the BFD packets as a heartbeat to determine that the other peer is operational.

The standby node may not receive several BFD packets due to a failure of the confirmed active node or due to a failure of the BFD protocol. When the standby node determines that the confirmed active node is not responsive, the standby node moves from the standby mode to the tentative active mode. Once the peers reestablish the heartbeat among them, the peer nodes use a novel protocol to directly communicate to each other to determine which node has to act as the confirmed active node and which node has to act as the standby.

A. Determining the Active and Standby States in Split-Brain Condition

In some cases, one of the peer nodes (e.g., the first peer node) may be in the confirmed active mode and the second node in the standby mode when the BFD session is lost between the two nodes. When the BFD session is lost due to the link failure rather than the failure of any of the peer nodes, the first node remains in the confirmed active mode while the standby node transitions into the tentative active mode. A split-brain condition, therefore, occurs where both nodes are unaware that the other node is in either the confirmed active or tentative active state and both nodes attempt to provide the services of an active node such as forwarding traffic and providing other logical network services.

Figure 2:
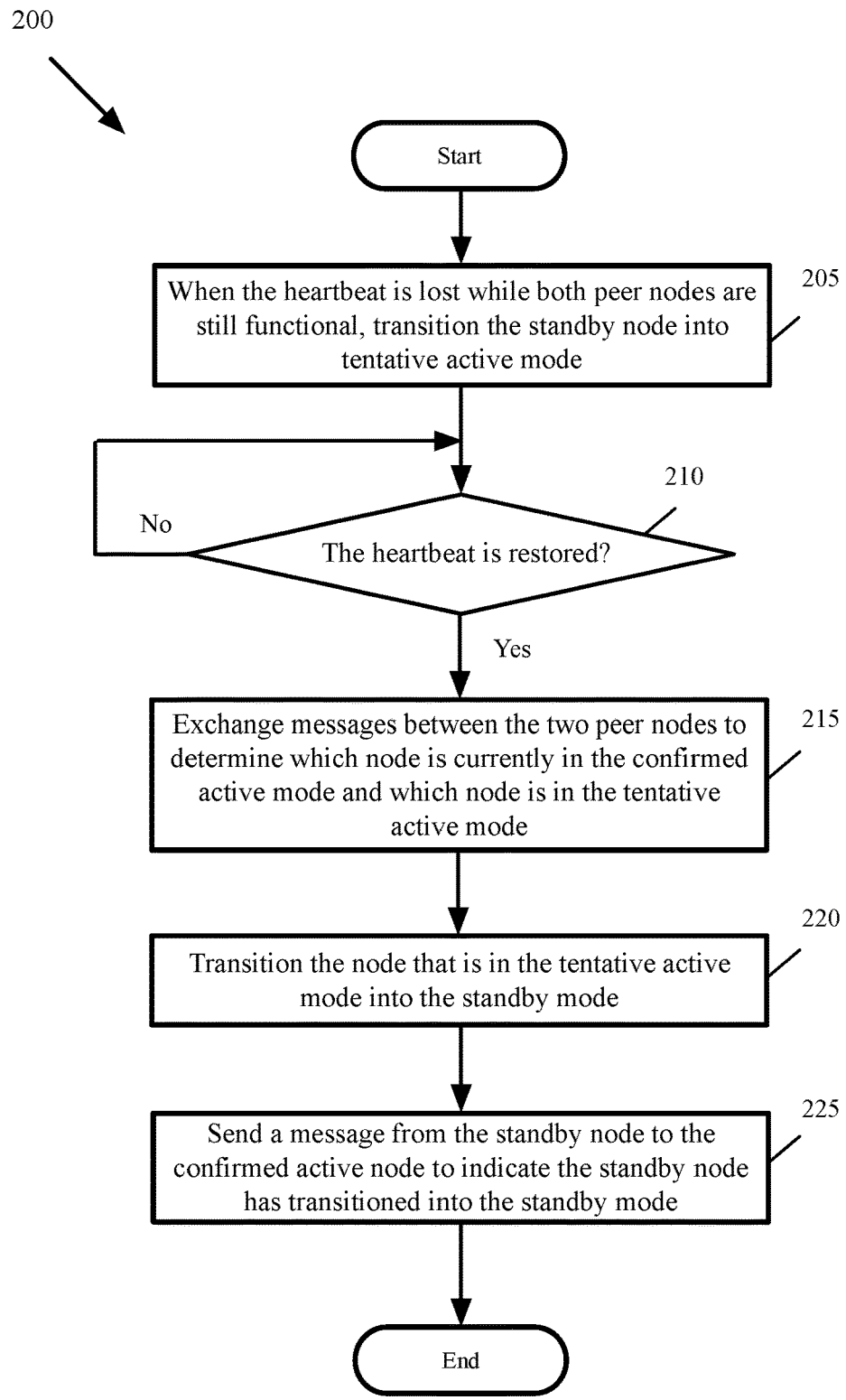
FIG. 2 conceptually illustrates a process for determining the active and standby states of the peer nodes in a split-brain condition in some embodiments.

Once the BFD session is restored, the two nodes communicate with each other by exchanging messages to determine which node should go into the standby mode. FIG. 2 conceptually illustrates a process 200 for determining the active and standby states of the peer nodes in a split-brain condition in some embodiments.

The process in some embodiments is performed by the peer nodes such as SR nodes 135 and 137 in FIG. 1B. The process starts when both nodes are functional and one node is in the confirmed active mode and the other node is in standby mode. As shown, when the heartbeat is lost while both peer nodes are still functional, the standby node transitions (at 205) into the tentative active mode. The condition may occur, e.g., when the BFD session is lost because of a link (such as link 149 in FIG. 1B), without any of the two nodes failing.

The process then determines (at 210) whether the heartbeat is restored. If not, the process returns to 210 (e.g., after a predetermined delay). Otherwise, the process exchanges (at 215) messages between the two peer nodes to determine which node is currently in the confirmed active mode and which node is in the tentative active mode.

Once the process determines that one node is in the confirmed active mode and the other node is in the tentative active mode, the process transitions (at 220) the node that is in the tentative active mode into the standby mode. The process then sends (at 225) a message from the standby node to the confirmed active node to indicate that the standby node has transitioned into the standby mode. The process then ends.

Figure 3A:
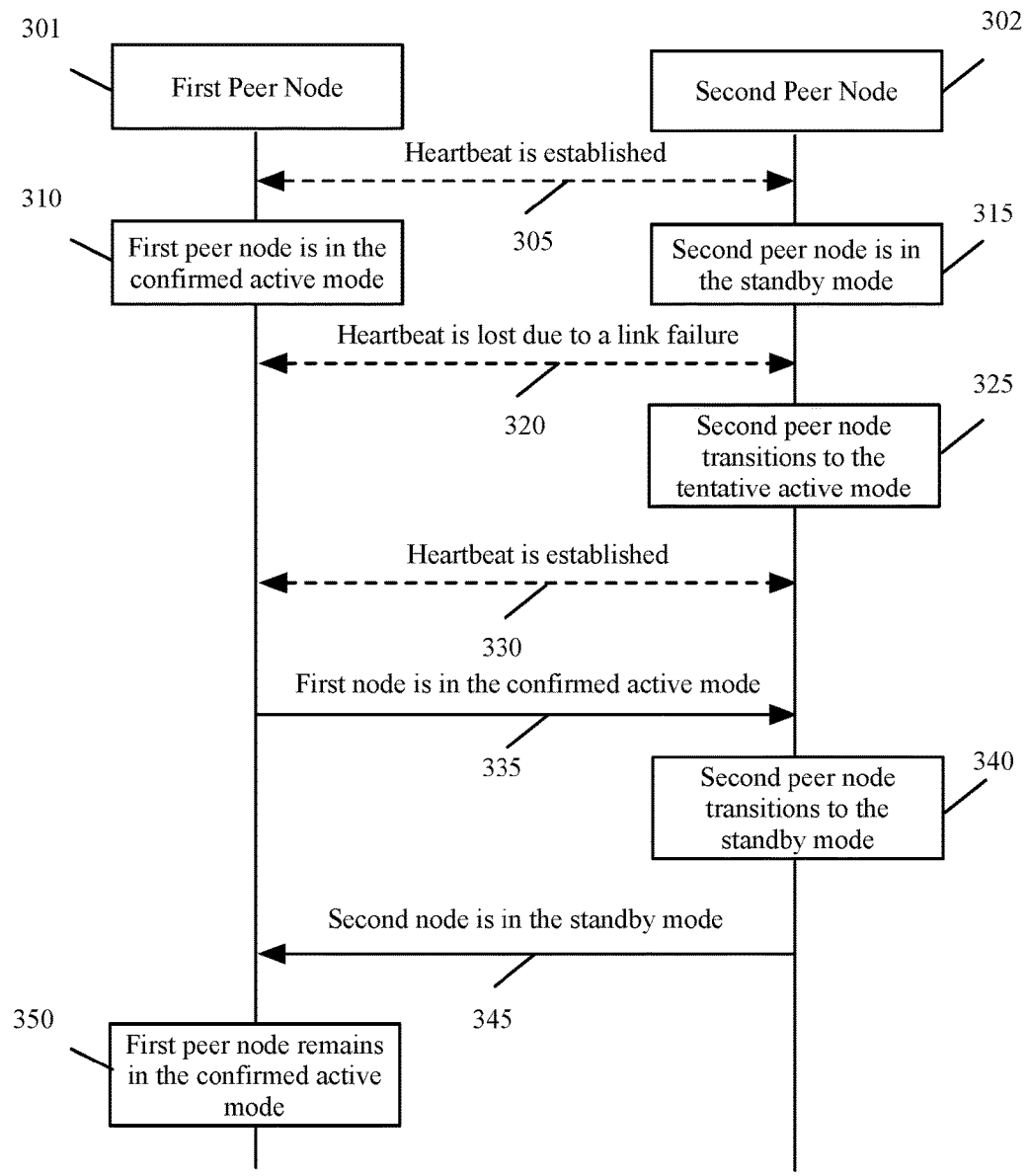
FIGS. 3A and 3B conceptually illustrate the messages exchanged between the two peer nodes to determine the active and standby states of the peer nodes in a split-brain condition in some embodiments.
Figure 3B:
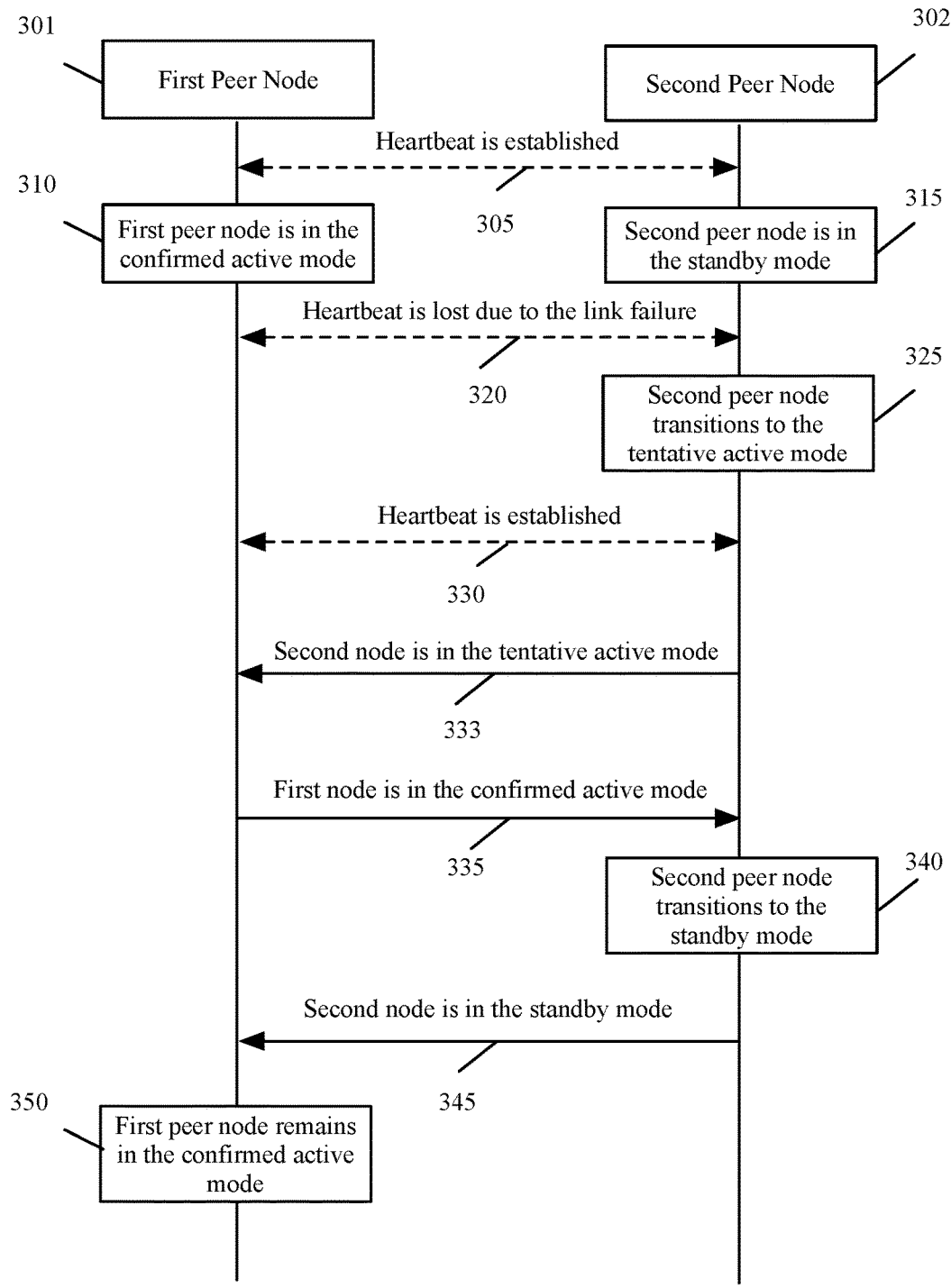

FIGS. 3A and 3B conceptually illustrate the messages exchanged between the two peer nodes to determine the active and standby states of the peer nodes in a split-brain condition in some embodiments. FIG. 3A shows a first peer node 301 and a second peer node 302. The two nodes maintain a heartbeat as shown by 305 (e.g., by using a BFD session between the two nodes or between the network entity such as gateways 145 and 150 in FIG. 1B that implement the two nodes 135 and 137). In this example, the first peer node is in the confirmed active mode (as shown by 310) and the second peer node is in the standby mode (as shown by 315).

As shown by 320, the heartbeat is subsequently lost while the two nodes are both still functional. For instance, the BFD session between the two nodes is lost due to a link failure. The second node transitions (as shown by 325) into the tentative active mode. The second node comes out of the standby mode to take the active role since the second node is not aware whether the loss of the heartbeat is due to a link failure or due to a failure in the first node. The second node, however, goes into the tentative active mode instead of the confirmed active mode, as going into the confirmed active mode requires a confirmation from the peer node. The first node, however, remains in the confirmed active mode.

The heartbeat is reestablished at a later time (as shown by 330). After the heartbeat is reestablished, the nodes start exchanging messages to determine which node should go back to the standby mode. The protocol used between the two nodes is referred to herein as application high availability (APPHA) protocol. The term application denotes the fact that the protocol is used to restore the roles of high availability pairs for different network nodes such as service routers, distributed routers, logical forwarding elements, gateways, etc.

It should be understood that the APPHA protocol is an on-demand protocol that operates separately from the BFD protocol. In some embodiments, the gateway pairs (such as gateways 145 and 150) may include a large number of SR pairs. For example, the gateways 145 and 150 may implement 500 or 5000 pairs of active-standby SRs. It is not desirable to have a separate BFD session that exchanges messages at a fast rate (e.g., 50 milliseconds per message) between each pair of SR nodes. Instead, one BFD session is maintained between each pair of the gateways. For instance, in an embodiment that includes 16 edge nodes (or gateways), each gateway only maintains 15 BFD sessions with the other peers. In the embodiments that the edge nodes are connected by overlay networks, each edge node runs BFD between its VTEP IP and each of the other 15 peers' VTEP IPs. In addition, a BFD message has a small size and there is not enough room in a BFD message for the peer nodes to exchange their states.

In the example of FIG. 3A, the first node is the node that sends a message to the peer node first. As shown by 335, the first node sends a message to the second node indicating that the first node is in the confirmed active mode. The second node transitions to the standby mode (as shown by 340). This second node makes the transition into the standby mode because the first node is already in the confirmed active mode.

The transition is regardless of whether or not the nodes are configured with different rankings and regardless of whether or not the second node is configured as the higher-ranking node. The second node sends a message (as shown by 345) to the first node indicating that the second node is in the standby mode. The first node remains (as shown by 350) in the confirmed active mode.

FIG. 3B is similar to FIG. 3A, except that upon the reestablishment of the heartbeat, the second node is the first node that sends a message to the peer node. As shown by 333, the second mode sends a message to the first node indicating that the second node is in the tentative active mode. Since the first node is already in the confirmed active mode, the first node does not change its state. Instead, the first node sends its own state (as shown by 335) to the second node indicating the first node is in the confirmed active mode. The rest of FIG. 3B is similar to FIG. 3A.

B. Determining the Active and Standby States when a Peer Node Becomes Functional after a Failure In cases where a first peer node that was not functional becomes ready to resume providing services, the first peer node has to determine the current mode of operation of the second peer node in order to transition into either the standby mode or the confirmed active mode.

Figure 4:
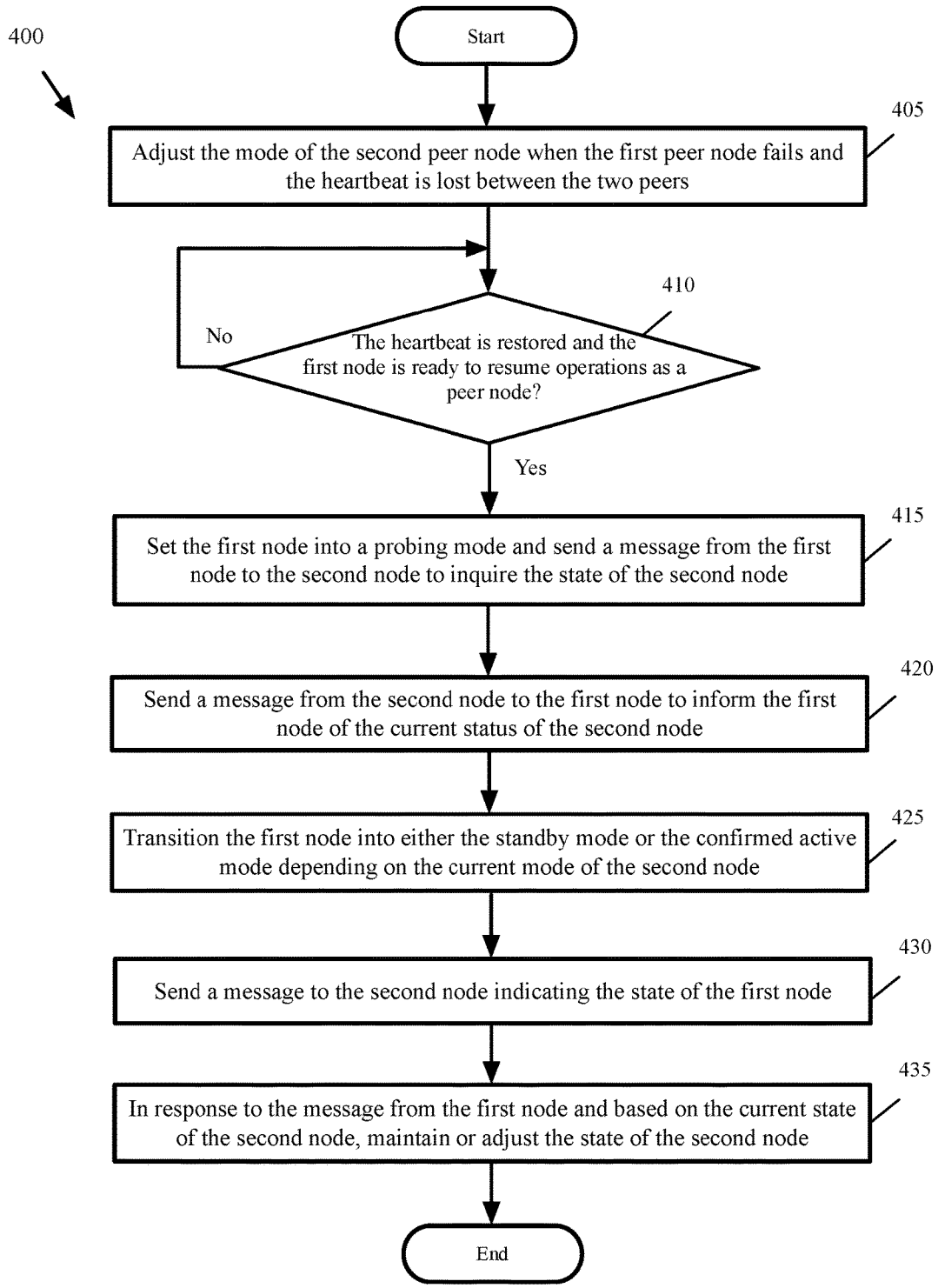
FIG. 4 conceptually illustrates a process for determining the state of the peer nodes when a peer node becomes functional after a failure in some embodiments.

The first node in some embodiments transitions from a down (or not ready) state to a probing state. The first node then sends a probe message to the second node to inquire the current state of the second node. FIG. 4 conceptually illustrates a process 400 for determining the state of the peer nodes when a peer node becomes functional after a failure in some embodiments. The process in some embodiments is performed by the peer nodes such as SR nodes 135 and 137 in FIG. 1B.

The process starts when a functioning node fails. As shown, the process adjusts (at 405) the mode of the second peer node when the first peer node fails and the heartbeat message is lost between the two nodes. For instance, if the second node is in standby mode, the second node transitions into the tentative active mode. On the other hand, if the second node is already in the confirmed active mode (i.e., if the failed node was the standby node), the second node remains in the confirmed active mode.

The process then determines (at 410) whether the heartbeat is restored and the first node is ready to resume operations as a peer node. The first node in some embodiments synchronizes its state in order to become ready to resume operations. If not, the process proceeds back to 410. Otherwise, the process sets (at 415) the first node into a probing mode and sends a message from the first node to the second node to inquire the state of the second node.

The process then sends (at 420) a message from the second node to the first node to inform the first node of the current status of the second node. The process then transitions (at 425) the first node into either the standby mode or the confirmed active mode depending on the current mode of the second node. For instance, if the second node is in either the tentative active mode or the confirmed active mode, the first node transitions into the standby mode. On the other hand, if the second node indicates that the second node is not ready, the first node transitions into the tentative active mode. The first node only transitions into the confirmed active mode when the second node eventually becomes ready and probes the first node. The second node would learn that the first node is in tentative active state. The second node then goes to the standby state and indicates so to the first node. At that moment, the first mode receives the unambiguous confirmation that the second node has taken standby role. The first node then goes from the tentative active state to the confirmed active state, concluding the negotiation.

Figure 5:
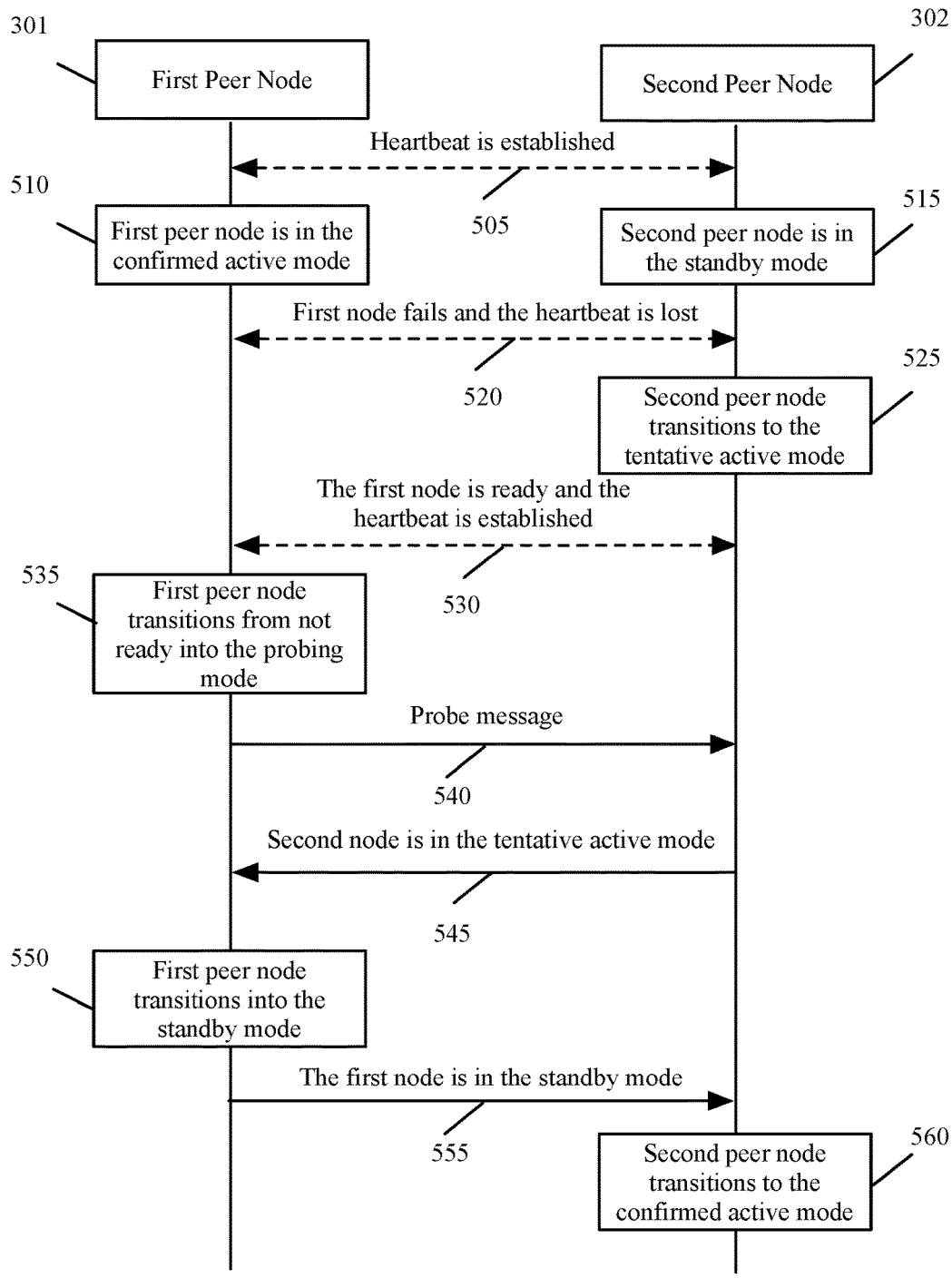
FIG. 5 conceptually illustrates the messages exchanged between the two peer nodes to determine the active and standby states of the peer nodes after a previously failed node becomes ready to resume operations as a peer node and the other node is in the tentative active mode in some embodiments.

The process then sends (at 430) a message from the first node to the second node indicating that the state of the first node. At 435, in response to the message from the first node and based on the current state of the second node, the process either maintains or adjusts the state of the second node. For instance, if the second node was in active confirmed mode or not ready mode, the second node remains in the same mode. On the other hand, if the second node was in the tentative active mode, the second node transitions into the confirmed active mode. The process then ends.

i. Determining the Active and Standby States when the First Peer Node Becomes Functional after a Failure and the Second Node is in Tentative Active Mode FIG. 5 conceptually illustrates the messages exchanged between the two peer nodes to determine the active and standby states of the peer nodes after a previously failed node becomes ready to resume operations as a peer node and the other node is in the tentative active mode in some embodiments. The figure shows a first peer node 301 and a second peer node 302. The two nodes maintain a heartbeat as shown by 505 (e.g., by using a BFD session between the two nodes or between the network entity such as gateways 145 and 150 in FIG. 1B that implement the two nodes 135 and 137). In this example, the first peer node is in the confirmed active mode (as shown by 510) and the second peer node is in the standby mode (as shown by 515).

As shown by 520, the first node fails and the heartbeat is lost due to the failure of the first node. After not receiving a predetermined number of heartbeat messages, the second node assumes that the confirmed active first node has failed. The second node transitions (as shown by 525) from the standby mode into the tentative active mode.

The second node comes out of the standby mode to take the active role since the second node is not aware whether the loss of the heartbeat is due to a link failure or due to a failure in the first node. The second node, however, goes into the tentative active mode instead of the confirmed active mode, as going into the confirmed active mode requires a confirmation from the peer node.

At a later time, the first node becomes ready to resume operations (as shown by 530) and the heartbeat is restored between the two peer nodes. The first node transitions (as shown by 535) from not ready mode into the probing state. The first node then sends (as shown by 540) a probe message to the second node indicating that the first node is in the probing mode.

Figure 6:
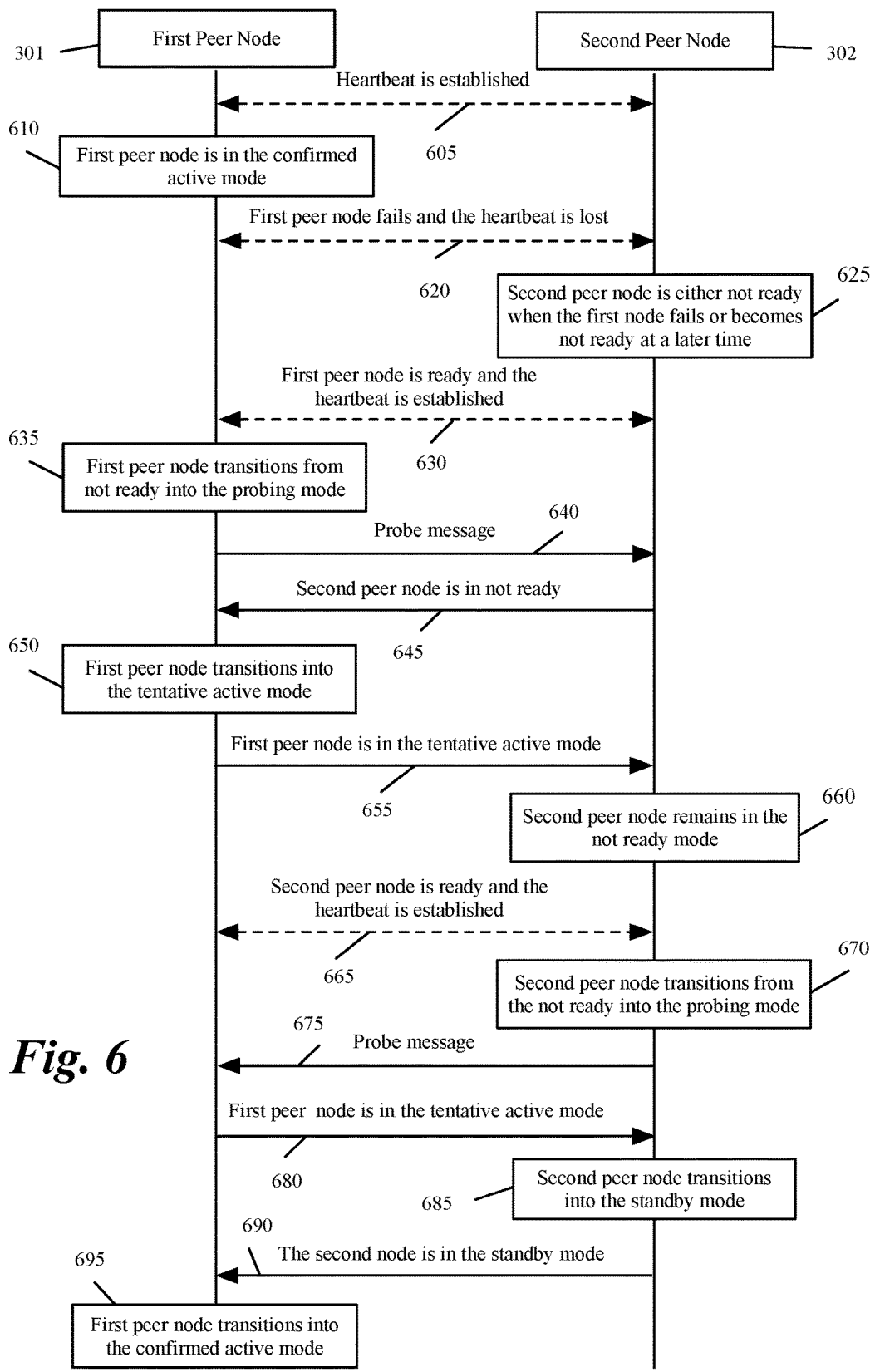
FIG. 6 conceptually illustrates the messages exchanged between the two peer nodes to determine the active and standby states of the peer nodes after a previously failed node becomes ready to resume operations as a peer node and the other node is not ready in some embodiments.

The second node sends (as shown by 545) a message to the first node indicating that the second node is in the tentative active mode. In response to the message from the second node, the first node transitions (as shown by 550) into the standby mode. The first node transitions to the standby mode regardless of whether or not the nodes are configured with different rankings and regardless of whether or not the first node is configured as the higher-ranking node. The first node sends a message (as shown by 555) to the second node indicating that the first node is in the standby mode. The second node uses the message as a confirmation from the peer that the second node can assume the role of the confirmed active node. The second node transitions (as shown by 560) from the tentative active mode to the confirmed active mode.

ii. Determining the Active and Standby States when the First Peer Node Becomes Functional after a Failure and the Second Node is not Ready FIG. 6 conceptually illustrates the messages exchanged between the two peer nodes to determine the active and standby states of the peer nodes after a previously failed node becomes ready to resume operations as a peer node and the other node is not ready in some embodiments. The figure shows a first peer node 301 and a second peer node 302. The two nodes maintain a heartbeat as shown by 605 (e.g., by using a BFD session between the two nodes or between the network entity such as gateways 145 and 150 in FIG. 1B that implement the two nodes 135 and 137). In this example, the first peer node is in the confirmed active mode (as shown by 610) prior to failure.

As shown by 620, the first node fails and the heartbeat is lost due to the failure of the first node. In this example, the second peer node is not ready to function as a peer node (as shown by 625) either when the first node fails or at a subsequent time. At a later time, the first node becomes ready to resume operations (as shown by 630) and the heartbeat is restored between the two peer nodes. The first node transitions (as shown by 635) from not ready mode into the probing state. The first node then sends (as shown by 640) a probe message to the second node indicating that the first node is in the probing mode.

The second node sends (as shown by 645) a message to the first node indicating that the second node is not ready to function as a peer node at this time. In response to the message from the second node, the first node transitions (as shown by 650) into the tentative active mode. The first node sends a message (as shown by 655) to the second node indicating that the first node is in the tentative active mode. The second node is not ready yet and remains (as shown by 660) in the not ready mode.

At a later time, the second node becomes ready to resume operations (as shown by 665) and the heartbeat is restored between the two peer nodes. The second node transitions (as shown by 670) from the not ready mode into the probing state. The second node then sends (as shown by 675) a probe message to the first node indicating that the second node is in the probing mode.

Figure 7:
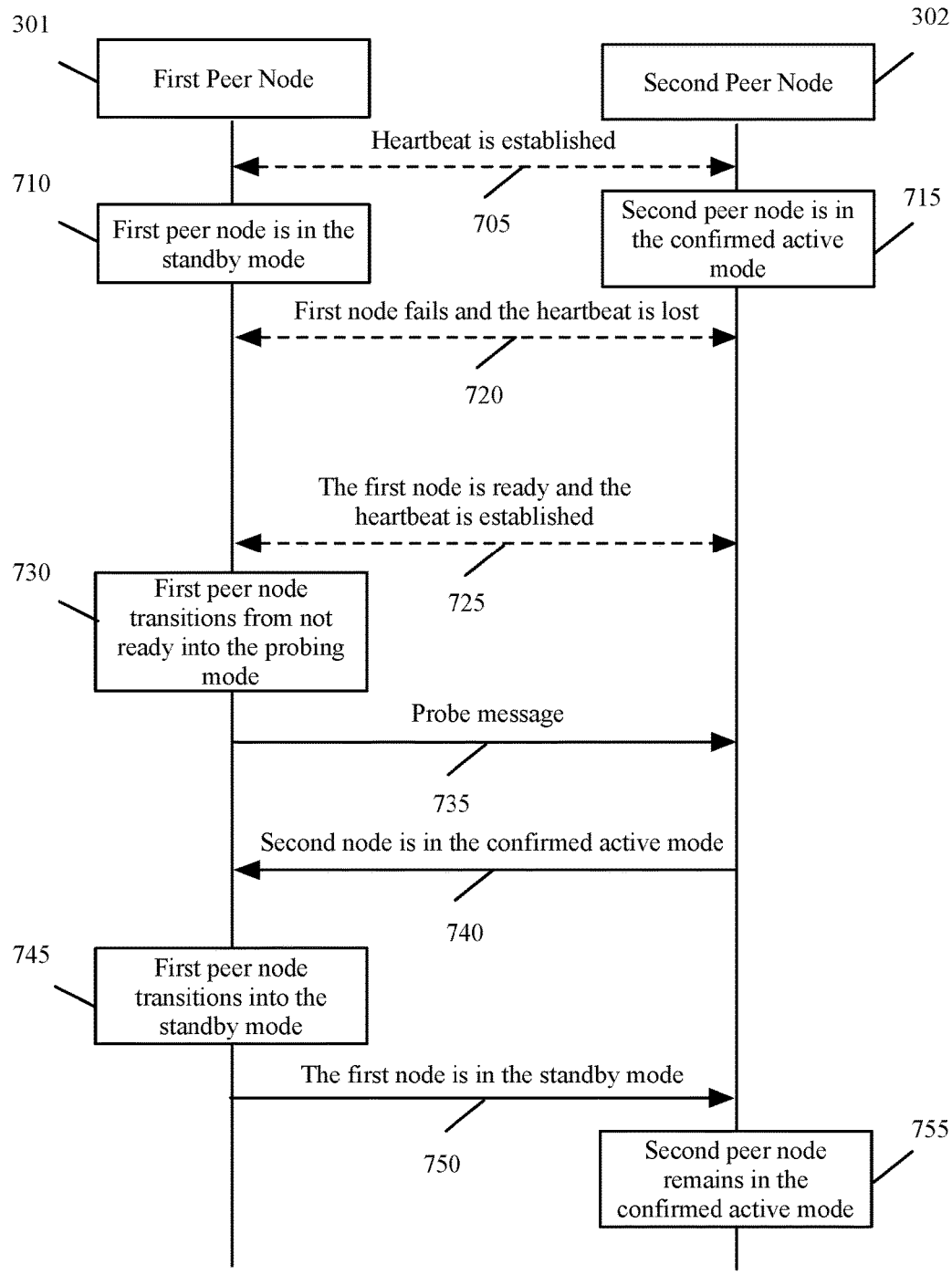
FIG. 7 conceptually illustrates the messages exchanged between the two peer nodes to determine the active and standby states of the peer nodes after a previously failed node becomes ready to resume operations as a peer node and the other node is in the confirmed active mode in some embodiments.

In response to the probe, the first node sends (as shown by 680) a message to the first node indicating that the first node is in the tentative active mode. In response to the message from the first node, the second node transitions (as shown by 685) into the standby mode. The second node sends a message (as shown by 690) to the first node indicating that the second node is in the standby mode. The first node uses (as shown by 695) the message as a confirmation from the peer that the first node can assume the role of the confirmed active node. The first node transitions from the tentative active mode to the confirmed active mode.

iii. Determining the Active and Standby States when the First Peer Node Becomes Functional after a Failure and the Second Node is in the Confirmed Active Mode FIG. 7 conceptually illustrates the messages exchanged between the two peer nodes to determine the active and standby states of the peer nodes after a previously failed node becomes ready to resume operations as a peer node and the other node is in the confirmed active mode in some embodiments. The figure shows a first peer node 301 and a second peer node 302. The two nodes maintain a heartbeat as shown by 705 (e.g., by using a BFD session between the two nodes or between the network entity such as gateways 145 and 150 in FIG. 1B that implement the two nodes 135 and 137). In this example, the first peer node is in the standby mode (as shown by 710) and the second peer node is in the confirmed active mode (as shown by 715).

As shown by 720, the first node fails and the heartbeat is lost due to the failure of the first node. The second node remains in the confirmed active mode. At a later time, the first node becomes ready to resume operations (as shown by 725) and the heartbeat is restored between the two peer nodes. The first node transitions (as shown by 730) from not ready mode into the probing state. The first node then sends (as shown by 735) a probe message to the second node indicating that the first node is in the probing mode.

The second node sends (as shown by 740) a message to the first node indicating that the second node is in the confirmed active mode. In response to the message from the second node, the first node transitions (as shown by 745)

into the standby mode. The first node transitions to the standby mode regardless of whether or not the nodes are configured with different rankings and regardless of whether or not the first node is configured as the higher-ranking node. The first node sends a message (as shown by 750) to the second node indicating that the first node is in the standby mode. The second node remains (as shown by 755) in the confirmed active mode.

iv. Determining the Active and Standby States when Both Nodes Become Functional and Probe Each Other at the Same Time In rare situations, both nodes may become ready to resume function as a peer node and send a probe message to the other node prior to receiving a response from the other node. In these situations, one of the nodes transitions into the confirmed active mode and the other node transitions into the standby mode based on predetermined criteria such as the rankings assigned to each node.

In other embodiments, a third entity arbitrates and determines which node should function as the confirmed node and which node should function as the standby node. For instance, an entity in the management plane and/or in the central control pane of the network makes the arbitration.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
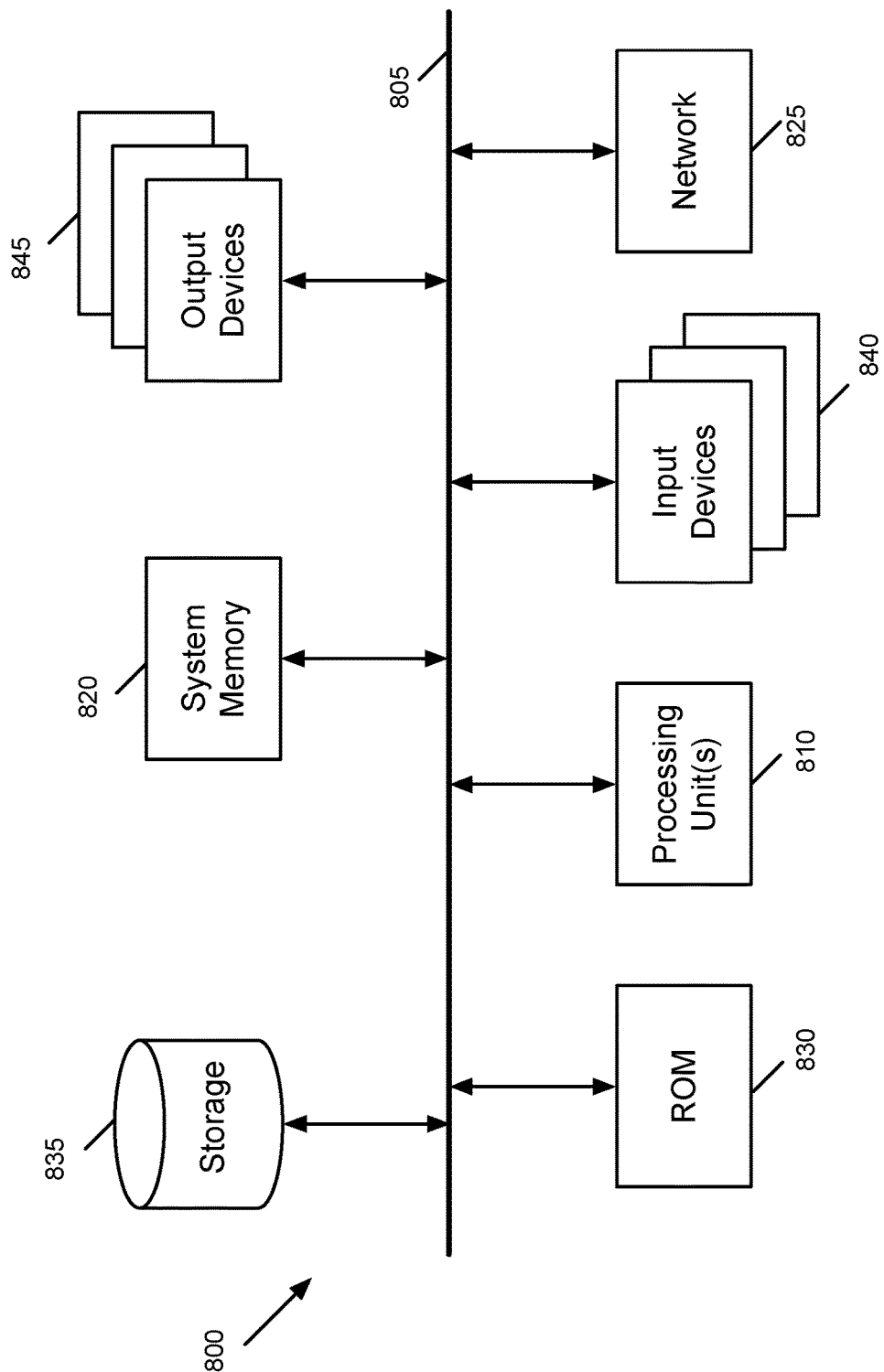
FIG. 8 conceptually illustrates an electronic system with which some embodiments of the invention are implemented.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., desktop computer, personal computer, tablet computer, server computer, mainframe, blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 820, a read-only memory (ROM) 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 820, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 820 is a read-and-write memory device. However, unlike storage device 835, the system memory is a volatile read-and-write memory, such as random access memory. The system memory stores some of the instructions and data that the processor needs at runtime. In some embodiments, the invention's processes are stored in the system memory 820, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices, such as a touchscreen, that function as both input and output devices.

Finally, as shown in FIG. 8, bus 805 also couples electronic system 800 to a network 825 through a network adapter (not shown). In this manner, the computer can be a part of a network of computers (such as a local area network ("LAN"), a wide area network ("WAN"), an Intranet, or a network of networks, such as the Internet. Any or all components of electronic system 800 may be used in conjunction with the invention.

Some embodiments include electronic components, such as microprocessors, storage, and memory, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 2 and 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of determining a state of each peer node in a pair of first and second peer message forwarding nodes, the first node configured as a confirmed active node and the second node configured as a standby node, the method comprising:

transitioning the second node into a tentative active mode when a predetermined number of heartbeat messages are lost between the pair nodes while the first and second nodes remain functional;

after the heartbeat messages are established between the peer nodes, sending a first message from the second node to the first node indicating that the second node is in the tentative active mode, receiving a second message at the second node, sent from the first node in response to receiving the first message from the second node, the second message indicating that the first node is in a confirmed active mode; and in response to the second message, (i) transitioning the second node from the tentative active mode into a standby mode and (ii) sending a third message from the second node to the first node indicating that the second node is in the standby mode, wherein the first node remains in the confirmed active mode and forwards messages received from a set of data compute nodes (DCNs).

2. The method of claim 1, wherein the pair of the first and second nodes is one of a pair of edge forwarding nodes, a pair of network forwarding elements, and a pair of service routers.

3. The method of claim 1, wherein the second node transitions into the standby mode regardless of whether or not the second node is configured as a higher-ranking node than the first node.

4. The method of claim 1, wherein the second node transitions into the standby mode without receiving a message from an entity other than the first node.

5. A non-transitory computer readable medium storing a program for determining a state of each peer node in a pair of first and second peer message forwarding nodes, the first node configured as a confirmed active node and the second node configured as a standby node, the program executable by a processing unit, the program comprising sets of instructions for:

transitioning the second node into a tentative active mode when a predetermined number of heartbeat messages are lost between the pair nodes while the first and second nodes remain functional;

after the heartbeat messages are established between the peer nodes, sending a first message from the second node to the first node indicating that the second node is in the tentative active mode, receiving a second message at the second node, sent from the first node in response to receiving the first message from the second node, the second message indicating that the first node is in a confirmed active mode; and in response to the second message, (i) transitioning the second node from the tentative active mode into a standby mode and (ii) sending a third message from the second node to the first node indicating that the second node is in the standby mode, wherein the first node remains in the confirmed active mode and forwards messages received from a set of data compute nodes (DCNs).

6. The non-transitory computer readable medium of claim 5, wherein the pair of the first and second nodes is one of a pair of edge forwarding nodes, a pair of network forwarding elements, and a pair of service routers.

7. The non-transitory computer readable medium of claim 5, wherein the second node transitions into the standby mode regardless of whether or not the second node is configured as a higher-ranking node than the first node.

8. The method of claim 5, wherein the second node transitions into the standby mode without receiving a message from an entity other than the first node.

9. A method of determining a state of each peer node in a pair of first and second peer message forwarding nodes, the first node configured as a confirmed active node and the second node configured as a standby node, the method comprising:

transitioning the second node into a tentative active mode when the first node fails and a predetermined number of heartbeat messages are lost between the pair nodes, wherein the second node forwards messages received from a set of data compute nodes (DCNs) in the tentative active mode;

after the first node recovers from the failure and the heartbeat messages are established between the peer nodes, (i) placing the first node in a probing mode and (ii) sending a first message from the first node to the second node indicating that the first node is in the probing mode;

in response to the first message, receiving a second message at the first node from the second node, the second message indicating that the second node is in the tentative active mode; and in response to the second message, (i) transitioning the first node into a standby mode and (ii) sending a third message from the first node to the second node indicating that the first node is in the standby mode, wherein receiving the third message after receiving the first message causes the second node to transition from the tentative active mode into a confirmed active mode, wherein the second node forwards messages received from a set of data compute nodes (DCNs) in the confirmed active mode.

10. The method of claim 9, wherein the pair of the first and second nodes is one of a pair of edge forwarding nodes, a pair of network forwarding elements, and a pair of service routers.

11. The method of claim 9, wherein the first node transitions into the standby mode regardless of whether or not the first node is configured as a higher-ranking node than the second node.

12. The method of claim 9, wherein the first node transitions into the standby mode without receiving a message from an entity other than the second node.

13. A method of determining a state of each peer node in a pair of first and second peer message forwarding nodes, the first node configured as a confirmed active node and the second node configured as a standby node, the method comprising:

losing a predetermined number of heartbeat messages between the pair nodes after the first node fails;

after the first node recovers from the failure and the heartbeat messages are established between the peer nodes, (i) placing the first node in a probing mode and (ii) sending a first message from the first node to the second node indicating that the first node is in the probing mode;

in response to the first message, receiving a second message at the first node from the second node, the second message indicating that the second node is not ready to function as a peer node; and in response to the second message, (i) transitioning the first node into a tentative active mode and (ii) sending a third message from the first node to the second node indicating that the first node is in the tentative active mode, wherein the first node forwards messages received from a set of data compute nodes (DCNs) in the tentative active mode;

receiving a fourth message at the first node from the second node; and transitioning the first node into the confirmed active mode only after receiving the second message from the second node indicating that the second node is not ready to function as a peer node and the fourth message from the second node.

14. The method of claim 13, wherein the pair of the first and second nodes is one of a pair of edge forwarding nodes, a pair of network forwarding elements, and a pair of service routers.

15. The method of claim 13, wherein the fourth message received at the first node from the second node comprises a probing message, the method further comprising, in response to the probing message, sending a fifth message from the first node to the second node indicating that the first node is in the tentative active mode.

16. The method of claim 15 further comprising:

receiving a sixth message at the first node from the second node indicating that the second node has transitioned into a standby mode; and in response to the sixth message, transitioning the first node from the tentative active mode to the confirmed active mode.

17. The method of claim 13, wherein the first node transitions into a standby mode without receiving a message from an entity other than the second node.

* * * * *